US012623849B2

(12) United States Patent
Kou et al.

(10) Patent No.: US 12,623,849 B2
(45) Date of Patent: May 12, 2026

(54) ROD-SPRING STRUCTURED CLAMPING AND LOOSENING DEVICE FOR DOWNHOLE BELT REPLACEMENT APPARATUS AND OPERATING METHOD THEREOF

(71) Applicants: TAIYUAN UNIVERSITY OF TECHNOLOGY, Shanxi (CN); NORTH CHINA INSTITUTE OF SCIENCE AND TECHNOLOGY, Hebei (CN)

(72) Inventors: Ziming Kou, Shanxi (CN); Baofu Kou, Shanxi (CN); Juan Wu, Shanxi (CN); Jianguo Luo, Hebei (CN); Pan Li, Hebei (CN); Haiqing Wang, Shanxi (CN); Jiabao Xue, Shanxi (CN); Guangping Huang, Shanxi (CN); Hang Liu, Shanxi (CN); Wei Wang, Hebei (CN); Zhihui Wu, Shanxi (CN); Yanfei Xue, Shanxi (CN)

(73) Assignees: TAIYUAN UNIVERSITY OF TECHNOLOGY, Shanxi (CN); NORTH CHINA INSTITUTE OF SCIENCE AND TECHNOLOGY, Hebei (CN)

( * ) Notice: Subject to any disclaimer, the term of this patent is extended or adjusted under 35 U.S.C. 154(b) by 204 days.

(21) Appl. No.: 18/660,175

(22) Filed: May 9, 2024

(65) Prior Publication Data
US 2025/0214781 A1     Jul. 3, 2025

(30) Foreign Application Priority Data

Dec. 27, 2023     (CN) .......................... 202311820427.1

(51) Int. Cl.
*B65G 15/60* (2006.01)

(52) U.S. Cl.
CPC .................................... *B65G 15/60* (2013.01)

(58) Field of Classification Search
None
See application file for complete search history.

(56) References Cited

U.S. PATENT DOCUMENTS

| 9,333,976 | B2 * | 5/2016 | Kahrger | ................. | B65G 39/00 |
| 10,071,860 | B2 * | 9/2018 | Kahrger | ................. | B65G 15/00 |
| 10,793,362 | B2 * | 10/2020 | Kou | ........................ | B65G 15/32 |

FOREIGN PATENT DOCUMENTS

| CN | 202481651 | U | * | 10/2012 |
| CN | 104016168 | A | * | 9/2014 |
| CN | 103009037 | B | * | 3/2015 |

* cited by examiner

*Primary Examiner* — Kavel Singh
(74) *Attorney, Agent, or Firm* — JCIPRNET

(57) ABSTRACT

A rod-spring structured clamping and loosening device for a downhole belt replacement apparatus includes an upper and a lower cylinder fixed seat. The upper and the lower cylinder fixed seat are respectively connected to a first and a second set of pull rods, and each set of the pull rods pass through a first transition plate, a second transition plate, and a third transition plate. A first chuck is mounted on a side of the first transition plate facing the upper cylinder fixed seat, a second chuck is mounted on a side of the third transition plate facing the lower cylinder fixed seat, and the first and the second set of the pull rods are fixed at the first and the second chuck. A disc spring is mounted between the first and the second transition plate, and a jack is mounted between the second and the third transition plate.

8 Claims, 2 Drawing Sheets

Initial state

Clamping state

Loosening state

ROD-SPRING STRUCTURED CLAMPING AND LOOSENING DEVICE FOR DOWNHOLE BELT REPLACEMENT APPARATUS AND OPERATING METHOD THEREOF

CROSS-REFERENCE TO RELATED APPLICATION

This application claims the priority benefit of China application serial no. 202311820427.1, filed on Dec. 27, 2023. The entirety of the above-mentioned patent application is hereby incorporated by reference herein and made a part of this specification.

BACKGROUND

Technical Field

The present disclosure relates to the technical field of rapid belt installation and replacement for a coal mine belt conveyor, and in particular, to a rod-spring structured clamping and loosening device for a downhole belt replacement apparatus and an operating method thereof.

Description of Related Art

A reverse pull-rod type pressure loading device provided in the prior art includes a base, a top plate, a holder, compression springs, cylindrical pins, connecting rods, a floating plate, a press cover, a stepped screw, and a jack. A piston rod of the jack pushes the top plate and then pulls the connecting rods, the floating plate, and a hexagon socket cap head screw to exert pressure on the press cover, and the press cover tightly presses against a disc part to achieve reverse loading. However, the structural design of this device only realizes tightening and cannot achieve the purpose of lifting.

A stone mill pressurizing device provided in the prior art includes an upper millstone, a lower millstone, a fixed frame, a rotating platform, a jack, and a supporting platform. The lower millstone is lifted up by the jack, and since no force is applied on the upper millstone, the grinding force between the lower millstone and the upper millstone is increased. However, this device uses the lifting force of the jack to increase the grinding effect, which realizes lifting but cannot achieve the purpose of tightening.

It is impossible to achieve two-way pressurization with a jack in the prior art due to limitations of the device structure, so that the belt of the coal mine belt conveyor cannot be rapidly replaced.

SUMMARY

To eliminate the defects in the prior art, the present disclosure provides a rod-spring structured clamping and loosening device for a downhole belt replacement apparatus and an operating method thereof, to solve the problem that a common one-way jack cannot realize clamping and loosening of a belt replacement apparatus during a rapid belt replacement process of a coal mine belt conveyor.

The present disclosure adopts the following technical solutions.

The present disclosure provides a rod-spring structured clamping and loosening device for a downhole belt replacement apparatus, where two sides of a crawler-type belt replacement apparatus are each provided with two sets of the rod-spring structured clamping and loosening device;

the two sets of the rod-spring structured clamping and loosening device each include an upper cylinder fixed seat and a lower cylinder fixed seat, where a first end of the upper cylinder fixed seat is connected to an upper crawler belt via a pin shaft, and a first end of the lower cylinder fixed seat is connected to a lower crawler belt via a pin shaft; and a second end of the upper cylinder fixed seat is connected to a second set of pull rods via a first set of nuts and a second end of the lower cylinder fixed seat is connected to a first set of pull rods via a second set of nuts; the first set of the pull rods and the second set of the pull rods each pass through a first transition plate, a second transition plate, and a third transition plate; a first chuck is mounted on a side of the first transition plate facing the upper cylinder fixed seat, a second chuck is mounted on a side of the third transition plate facing the lower cylinder fixed seat, the first set of the pull rods are fixed by a third set of nuts at the first chuck, and the second set of the pull rods are fixed by a fourth set of nuts at the second chuck; a disc spring is mounted between the first transition plate and the second transition plate, and a jack is mounted between the second transition plate and the third transition plate; a first set of spacer sleeves are mounted on the second set of the pull rods between the second end of the upper cylinder fixed seat and the first chuck, and a second set of spacer sleeves are mounted on the first set of the pull rods between the second end of the lower cylinder fixed seat and the second chuck.

The second end of the upper cylinder fixed seat is connected to the second set of the pull rods via the first set of nuts, and starting from the upper cylinder fixed seat, the first transition plate, the second transition plate, and the third transition plate are sequentially arranged on the second set of the pull rods; and the second end of the lower cylinder fixed seat is connected to the first set of the pull rods via the second set of nuts, and starting from the lower cylinder fixed seat, the third transition plate, the second transition plate, and the first transition plate are sequentially arranged on the first set of the pull rods.

The first set of the pull rods and the second set of the pull rods each include three pull rods.

The second end of the upper cylinder fixed seat and the second end of the lower cylinder fixed seat are both circular bases, each being evenly provided with three threaded holes, where the three threaded holes in the upper cylinder fixed seat are distributed along a first circumference, and the three threaded holes in the lower cylinder fixed seat are distributed along a second circumference; and each of the first transition plate, the second transition plate, and the third transition plate is provided with two sets of holes, where a first set of the holes are arranged along the first circumference, and a second set of the holes are arranged along the second circumference.

The threaded holes at the second end of the upper cylinder fixed seat are connected to the second set of the pull rods via the first set of nuts, and the second set of the pull rods sequentially pass through the holes along the first circumference of the first transition plate, the second transition plate, and the third transition plate; and the threaded holes at the second end of the lower cylinder fixed seat are connected to the first set of the pull rods via the second set of nuts, and the first set of the pull rods sequentially pass through the holes along the second circumference of the third transition plate, the second transition plate, and the first transition plate.

The second set of the pull rods are fixed by a fifth set of nuts at the second transition plate.

The first set of the pull rods are fixed by the third set of nuts at the first chuck, and the second set of the pull rods are fixed by the fourth set of nuts at the second chuck.

The present disclosure also provides an operating method of the rod-spring structured clamping and loosening device for a downhole belt replacement apparatus, where the method includes:

tightening the third set of nuts at the first chuck and the fourth set of nuts at the second chuck;

lifting the second transition plate by the jack, lifting the disc spring by the second transition plate, lifting the first transition plate by the disc spring, pulling the lower cylinder fixed seat inward by the first transition plate via the first set of the pull rods, and pulling the upper cylinder fixed seat inward by the third transition plate via the second set of the pull rods; clamping the upper crawler belt by the upper cylinder fixed seat via the pin shaft, and clamping the lower crawler belt by the lower cylinder fixed seat via the pin shaft to realize clamping of the downhole belt replacement apparatus;

loosening the third set of nuts at the first chuck and the fourth set of nuts at the second chuck; and lifting the second transition plate by the jack, lifting the disc spring by the second transition plate, lifting the first transition plate by the disc spring, pushing the upper cylinder fixed seat outward by the first transition plate via the first set of the spacer sleeves, and pushing the lower cylinder fixed seat outward by the third transition plate via the second set of the spacer sleeves; loosening the upper crawler belt by the upper cylinder fixed seat via the pin shaft, and loosening the lower crawler belt by the lower cylinder fixed seat via the pin shaft to realize loosening of the downhole belt replacement apparatus.

Compared with the prior art, the present disclosure has at least the following advantages. According to the rod-spring structured clamping and loosening device for a downhole belt replacement apparatus provided by the present disclosure, through mutual cooperation of the rod-spring structures, the clamping and loosening of the downhole belt replacement apparatus can be realized by one-way pressurization of the manual hydraulic jack, which solves the problem that a common one-way jack cannot realize clamping and loosening of a belt replacement apparatus during a rapid belt replacement process of a coal mine belt conveyor.

DESCRIPTION OF THE EMBODIMENTS

In order to make the objectives, technical solutions, and advantages of the present disclosure clearer, the technical solutions of the present disclosure are clearly and completely described below with reference to the accompanying drawings of the embodiments of the present disclosure. The embodiments to be described are only a part rather than all of the embodiments of the present disclosure. All other embodiments derived by persons of ordinary skill in the art based on the spirit of the present disclosure without creative efforts shall fall within the protection scope of the present disclosure.

Figure 1:
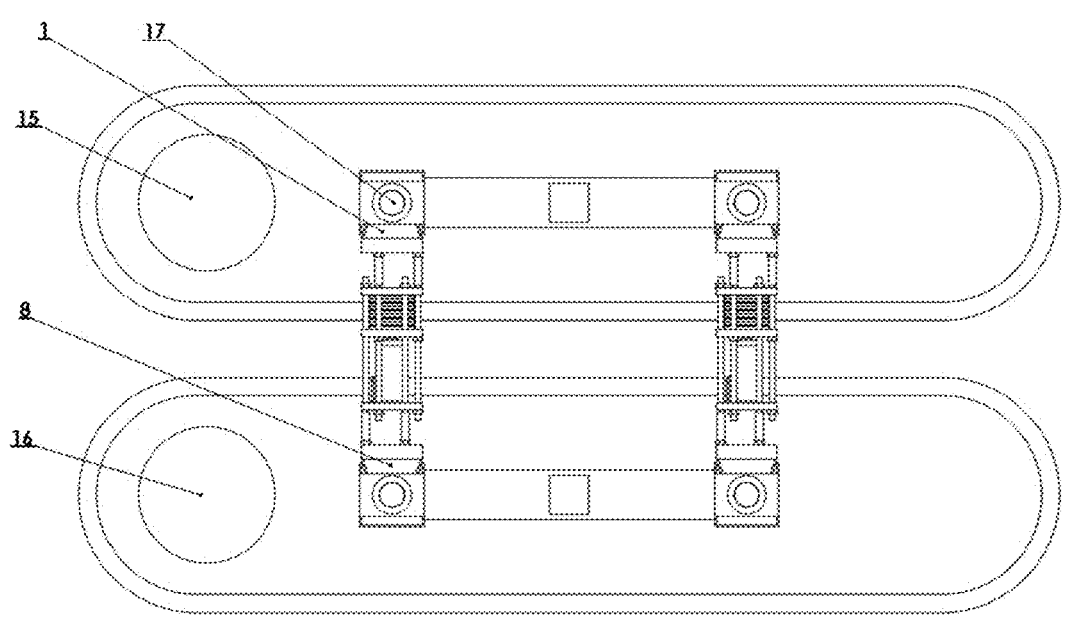
FIG. 1 is a diagram showing a rod-spring structured clamping and loosening device for a downhole belt replacement apparatus provided by the present disclosure assembled with crawler belts.

As shown in FIG. 1, rod-spring structured clamping and loosening devices for a downhole belt replacement apparatus provided by the present disclosure are mounted on two sides of a crawler-type belt replacement apparatus, with two sets of the rod-spring structured clamping and loosening device being arranged on each side. The rod-spring structured clamping and loosening device includes an upper cylinder fixed seat 1 and a lower cylinder fixed seat 8. A first end of the upper cylinder fixed seat 1 is connected to an upper crawler belt 15 via a pin shaft 17, and a first end of the lower cylinder fixed seat 8 is connected to a lower crawler belt 16 via a pin shaft.

A second end of the upper cylinder fixed seat 1 is connected to a second set of pull rods 11 and a second end of the lower cylinder fixed seat 8 is connected to a first set of pull rods 4. Each set of the pull rods pass through a first transition plate 3, a second transition plate 5, and a third transition plate 7.

Figure 2:
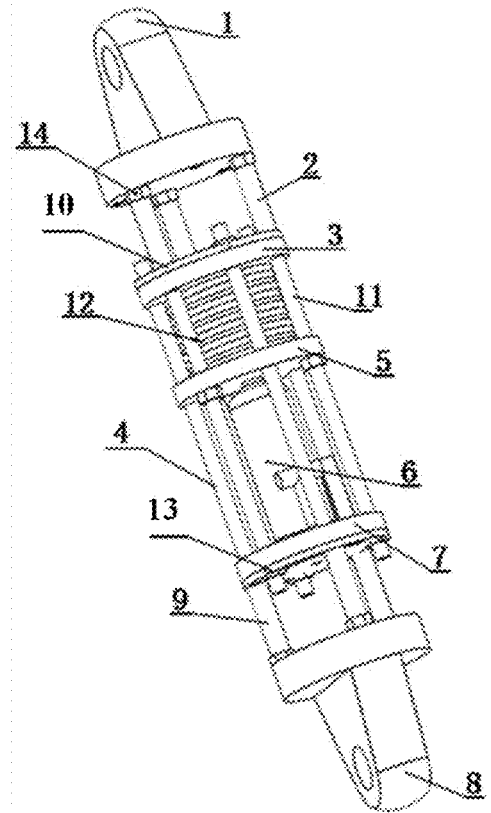
FIG. 2 is a structural diagram of the rod-spring structured clamping and loosening device for a downhole belt replacement apparatus provided by the present disclosure.
Figure 3:
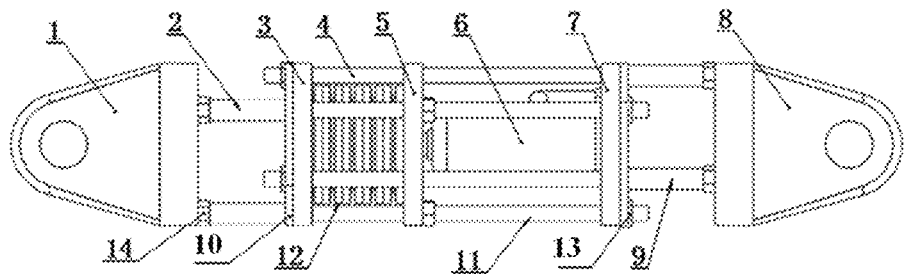
FIG. 3 is a front view of the rod-spring structured clamping and loosening device for a downhole belt replacement apparatus provided by the present disclosure.

As shown in FIG. 2 and FIG. 3, the second end of the upper cylinder fixed seat 1 is connected to the second set of the pull rods 11 via a set of nuts 14. Starting from the upper cylinder fixed seat 1, the first transition plate 3, the second transition plate 5, and the third transition plate 7 are sequentially arranged on the second set of the pull rods 11. The second end of the lower cylinder fixed seat 8 is connected to the first set of the pull rods 4 via a set of nuts 14. Starting from the lower cylinder fixed seat 8, the third transition plate 7, the second transition plate 5, and the first transition plate 3 are sequentially arranged on the first set of the pull rods 4. According to the above structure, the three transition plates are interconnected via the pull rods and the nuts 14.

Specifically, each set of the pull rods includes three pull rods. The second end of the upper cylinder fixed seat 1 and the second end of the lower cylinder fixed seat 8 are both circular bases, each being evenly provided with three threaded holes. The three threaded holes in the upper cylinder fixed seat 1 are distributed along a first circumference, and the three threaded holes in the lower cylinder fixed seat 8 are distributed along a second circumference. Each of the transition plates is provided with two sets of holes, a first set of the holes are arranged along the first circumference, and a second set of the holes are arranged along the second circumference.

The threaded holes at the second end of the upper cylinder fixed seat 1 are connected to the second set of the pull rods via a set of nuts 14. The second set of the pull rods sequentially pass through the holes along the first circumference of the first transition plate 3, the second transition plate 5, and the third transition plate 7. The threaded holes at the second end of the lower cylinder fixed seat 8 are connected to the first set of the pull rods via a set of nuts 14. The first set of the pull rods sequentially pass through the holes along the second circumference of the third transition plate 7, the second transition plate 5, and the first transition plate 3. The second set of the pull rods are fixed by a set of nuts 14 at the second transition plate 5.

Further, the size of each hole matches with the outer diameter of the pull rod, so that the pull rods are in clearance fit with the transition plates, the transition plates can move freely on the pull rods, and the pull rods limit the rotational degrees of freedom of the transition plates.

Specifically, a first chuck 10 is mounted on a side of the first transition plate 3 facing the upper cylinder fixed seat 1, the first chuck 10 is provided with holes along the second circumference, and the first set of the pull rods are fixed by a set of nuts 14 at the first chuck 10. A second chuck 13 is mounted on a side of the third transition plate 7 facing the lower cylinder fixed seat 8, the second chuck 13 is provided with holes along the first circumference, and the second set of the pull rods are fixed by a set of nuts 14 at the second chuck 13.

The pull rods are fixedly connected to the upper cylinder fixed seat 1, the lower cylinder fixed seat 8, and the transition plates via the nuts 14 and the chucks, so that the working conditions of the device can be switched by loosening instead of removing the nuts 14.

Specifically, the five sets of the nuts 14 are all standard parts, and each set of the nuts 14 includes three nuts 14 for connecting and fixing the pull rods.

Specifically, a first set of spacer sleeves 2 are mounted on the second set of the pull rods between the second end of the upper cylinder fixed seat 1 and the first chuck 10. A second set of spacer sleeves 9 are mounted on the first set of the pull rods between the second end of the lower cylinder fixed seat 8 and the second chuck 13. The two sets of the spacer sleeves are used for loosening of the device.

A disc spring 12 is mounted between the first transition plate 3 and the second transition plate 5 and is used for absorbing vibration caused by external pressure changes. The disc spring 12 in the present disclosure can not only transmit the force of a manual hydraulic jack, but also absorb the vibration caused by pressure changes in the external environment during belt replacement, thereby ensuring the safety in operation.

A jack 6 is mounted between the second transition plate 5 and the third transition plate 7. When pressure is applied, the jack 6 provides power and the transition plates are forced to drive the pull rods to move, which realizes clamping of the device.

Specifically, the jack 6 is a 5-ton manual hydraulic jack.

Figure 4:
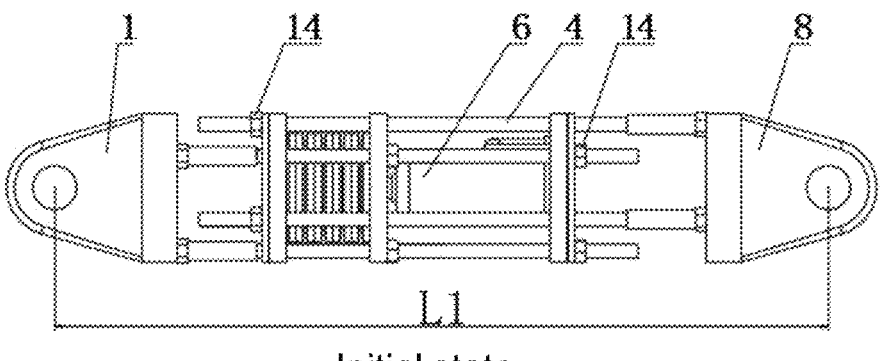
FIG. 4 is a schematic diagram showing working states of the rod-spring structured clamping and loosening device for a downhole belt replacement apparatus provided by the present disclosure.
Figure 4:
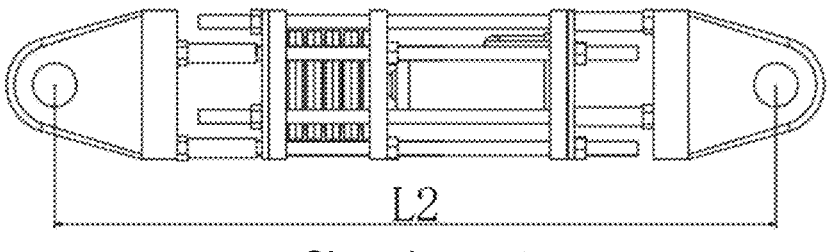
Figure 4:
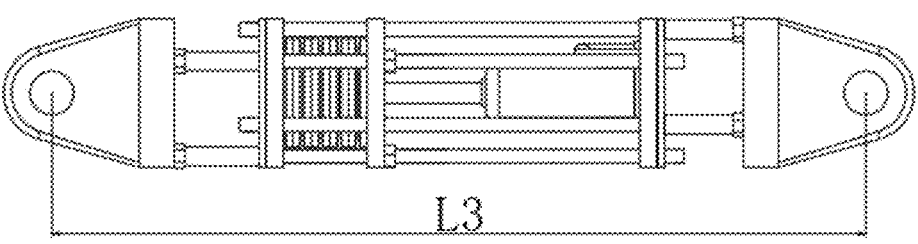

The initial state, the clamping state, and the loosening state of the rod-spring structured clamping and loosening device for a downhole belt replacement apparatus provided by the present disclosure are shown in FIG. 4. The length of the device satisfies the relationship of L2<L1<L3 in the initial state, the clamping state, and the loosening state.

The present disclosure also provides an operating method of the rod-spring structured clamping and loosening device for a downhole belt replacement apparatus. The method includes the following steps:

The nuts 14 at the first chuck 10 and the second chuck 13 are tightened.

The jack 6 lifts the second transition plate 5, the second transition plate 5 lifts the disc spring 12, the disc spring 12 lifts the first transition plate 3, the first transition plate 3 pulls the lower cylinder fixed seat 8 inward via the first set of the pull rods, and the third transition plate 7 pulls the upper cylinder fixed seat 1 inward via the second set of the pull rods. The upper cylinder fixed seat 1 clamps the upper crawler belt via the pin shaft, and the lower cylinder fixed seat 8 clamps the lower crawler belt via the pin shaft to realize clamping of the downhole belt replacement apparatus.

The nuts 14 at the first chuck 10 and the second chuck 13 are loosened.

The jack 6 lifts the second transition plate 5, the second transition plate 5 lifts the disc spring 12, the disc spring 12 lifts the first transition plate 3, the first transition plate 3 pushes the upper cylinder fixed seat 1 outward via the first set of the spacer sleeves, and the third transition plate 7 pushes the lower cylinder fixed seat 8 outward via the second set of the spacer sleeves. The upper cylinder fixed seat 1 loosens the upper crawler belt via the pin shaft, and the lower cylinder fixed seat 8 loosens the lower crawler belt via the pin shaft to realize loosening of the downhole belt replacement apparatus.

The rod-spring structure in the present disclosure consists of the pull rods, the transition plates, and the nuts 14. The nuts 14 can be tightened or loosened to realize clamping or loosening of the device, which is simple to operate. The four rod-spring structured clamping and loosening devices are evenly mounted on two sides of the belt replacement apparatus. During the rapid belt replacement process, the rod-spring structured clamping and loosening devices exert pressure on the belt replacement apparatus to tightly press against the belt, and the old belt can be pulled out by the belt replacement apparatus. After the belt replacement is completed, the rod-spring structured clamping and loosening devices lift the belt replacement apparatus to loosen the belt.

It should be noted that the above embodiments are merely used for illustrating instead of limiting the technical solutions of the present disclosure. Although the present disclosure has been described in detail with reference to the above embodiments, persons of ordinary skill in the art should understand that modifications or equivalent replacements can still be made to the specific implementation of the present disclosure, and all the modifications or equivalent replacements that do not depart from the spirit and scope of the present disclosure shall fall within the protection scope of the appended claims of the present disclosure.

What is claimed is:

1. A rod-spring structured clamping and loosening device for a downhole belt replacement apparatus, wherein two sides of a crawler-type belt replacement apparatus are each provided with two sets of the rod-spring structured clamping and loosening device, the two sets of the rod-spring structured clamping and loosening device each comprise an upper cylinder fixed seat and a lower cylinder fixed seat, wherein a first end of the upper cylinder fixed seat is connected to an upper crawler belt via a pin shaft, and a first end of the lower cylinder fixed seat is connected to a lower crawler belt via another pin shaft;

a second end of the upper cylinder fixed seat is connected to a second set of pull rods via a first set of nuts and a second end of the lower cylinder fixed seat is connected to a first set of pull rods via a second set of nuts; the first set of the pull rods and the second set of the pull rods each pass through a first transition plate, a second transition plate, and a third transition plate; a first chuck is mounted on a side of the first transition plate facing the upper cylinder fixed seat, a second chuck is mounted on a side of the third transition plate facing the lower cylinder fixed seat, the first set of the pull rods are fixed by a third set of nuts at the first chuck, and the second set of the pull rods are fixed by a fourth set of nuts at the second chuck; a disc spring is mounted between the first transition plate and the second transition plate, and a jack is mounted between the second transition plate and the third transition plate; a first set of spacer sleeves are mounted on the second set of the pull rods between the second end of the upper cylinder fixed seat and the first chuck, and a second set of spacer sleeves are mounted on the first set of the pull rods between the second end of the lower cylinder fixed seat and the second chuck.

2. The rod-spring structured clamping and loosening device for the downhole belt replacement apparatus according to claim 1, wherein:

the second end of the upper cylinder fixed seat is connected to the second set of the pull rods via the first set of the nuts, and starting from the upper cylinder fixed seat, the first transition plate, the second transition plate, and the third transition plate are sequentially arranged on the second set of the pull rods; and the second end of the lower cylinder fixed seat is connected to the first set of the pull rods via the second set of the nuts, and starting from the lower cylinder fixed seat, the third transition plate, the second transition plate, and the first transition plate are sequentially arranged on the first set of the pull rods.

3. The rod-spring structured clamping and loosening device for the downhole belt replacement apparatus according to claim 1, wherein:

the first set of the pull rods and the second set of the pull rods each comprise three pull rods.

4. The rod-spring structured clamping and loosening device for the downhole belt replacement apparatus according to claim 1, wherein:

the second end of the upper cylinder fixed seat and the second end of the lower cylinder fixed seat are both circular bases, each being evenly provided with three threaded holes, wherein the three threaded holes in the upper cylinder fixed seat are distributed along a first circumference, and the three threaded holes in the lower cylinder fixed seat are distributed along a second circumference;

each of the first transition plate, the second transition plate, and the third transition plate is provided with two sets of holes, wherein a first set of the two sets of holes are arranged along the first circumference, and a second set of the two sets of holes are arranged along the second circumference.

5. The rod-spring structured clamping and loosening device for the downhole belt replacement apparatus according to claim 4, wherein:

the threaded holes at the second end of the upper cylinder fixed seat are connected to the second set of the pull rods via the first set of the nuts, and the second set of the pull rods sequentially pass through the holes along the first circumference of the first transition plate, the second transition plate, and the third transition plate; and the threaded holes at the second end of the lower cylinder fixed seat are connected to the first set of the pull rods via the second set of the nuts, and the first set of the pull rods sequentially pass through the holes along the second circumference of the third transition plate, the second transition plate, and the first transition plate.

6. The rod-spring structured clamping and loosening device for the downhole belt replacement apparatus according to claim 1, wherein:

the second set of the pull rods are fixed by a fifth set of nuts at the second transition plate.

7. The rod-spring structured clamping and loosening device for the downhole belt replacement apparatus according to claim 1, wherein:

the first set of the pull rods are fixed by the third set of the nuts at the first chuck, and the second set of the pull rods are fixed by the fourth set of the nuts at the second chuck.

8. An operating method of the rod-spring structured clamping and loosening device for the downhole belt replacement apparatus according to claim 1, comprising:

tightening the third set of the nuts at the first chuck and the fourth set of the nuts at the second chuck;

lifting the second transition plate by the jack, lifting the disc spring by the second transition plate, lifting the first transition plate by the disc spring, pulling the lower cylinder fixed seat inward by the first transition plate via the first set of the pull rods, and pulling the upper cylinder fixed seat inward by the third transition plate via the second set of the pull rods; clamping the upper crawler belt by the upper cylinder fixed seat via the pin shaft, and clamping the lower crawler belt by the lower cylinder fixed seat via the another pin shaft to realize clamping of the downhole belt replacement apparatus;

loosening the third set of the nuts at the first chuck and the fourth set of the nuts at the second chuck; and lifting the second transition plate by the jack, lifting the disc spring by the second transition plate, lifting the first transition plate by the disc spring, pushing the upper cylinder fixed seat outward by the first transition plate via the first set of the spacer sleeves, and pushing the lower cylinder fixed seat outward by the third transition plate via the second set of the spacer sleeves; loosening the upper crawler belt by the upper cylinder fixed seat via the pin shaft, and loosening the lower crawler belt by the lower cylinder fixed seat via the another pin shaft to realize loosening of the downhole belt replacement apparatus.

* * * * *